(12) United States Patent
Druckman et al.

(10) Patent No.: US 7,302,150 B2
(45) Date of Patent: Nov. 27, 2007

(54) ILLUMINATED LATCH INDICATOR ASSEMBLY

(75) Inventors: Ralph D. Druckman, Everett, WA (US); Chris Samhammer, Redmond, WA (US); Chad D. Schmitz, Arlington, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/380,500

(22) Filed: Apr. 27, 2006

(65) Prior Publication Data

US 2007/0253674 A1    Nov. 1, 2007

(51) Int. Cl.
*G02B 6/00* (2006.01)
*G02B 6/36* (2006.01)

(52) U.S. Cl. .................. 385/134; 385/53; 385/147
(58) Field of Classification Search ...... None
See application file for complete search history.

(56) References Cited

U.S. PATENT DOCUMENTS

| 4,629,090 A * | 12/1986 | Harris et al. ............ 221/7 |
| 6,340,933 B1 | 1/2002 | Chen et al. |
| 6,829,150 B2 | 12/2004 | Larson |
| 2004/0195944 A1 * | 10/2004 | Sugihara ................ 312/283 |
| 2006/0087272 A1 * | 4/2006 | Matsuyama et al. ...... 318/466 |

FOREIGN PATENT DOCUMENTS

| JP | 2006-312816 | 9/2007 |
| WO | 2004/021747 A2 | 3/2004 |

OTHER PUBLICATIONS

Unknown Author, Touchy Subject, Aircraft Interiors International, Sep. 2005, pp. 63, 65, 67-68, UK & International Press, United Kingdom.

* cited by examiner

*Primary Examiner*—Tina M. Wong
(74) *Attorney, Agent, or Firm*—Ostrager Chong Flaherty & Broitman P.C.

(57) ABSTRACT

An assembly for providing an indicator includes a light source, a stationary member, a first optical fiber coupled to the light source and to the stationary member, a movable panel, and a first latch assembly coupling the stationary member and the movable panel. The latch assembly has an unlatched position and a latched position. The assembly further includes a second optical fiber coupled to the movable panel, an indicator coupled to the movable panel, and a second optical fiber whereby in the last position, light from the first optical fiber is coupled to the second optical fiber differently than in the latched position.

4 Claims, 4 Drawing Sheets

ILLUMINATED LATCH INDICATOR ASSEMBLY

TECHNICAL FIELD

The present invention relates generally to latches for moving panels and, more particularly, to an indicator to easily ascertain if a latch is properly closed.

BACKGROUND

Storage bins, and more particularly, overhead storage bins are used in airplanes to store carry-on luggage. Oftentimes the storage bins are used to capacity. Storage bins are placed in the open position so that passengers may place their carry-on luggage therein. Flight attendants or passengers close the storage bins when they are full.

A latch handle is typically used to actuate latches inside the storage bin and are used to release the storage bin so that it may be positioned in an open position. Oftentimes, one latch is provided for each of the sides of the storage bin.

During various maneuvers, storage bins may open allowing contents to potentially fall therefrom. Oftentimes this is due to one of the two latches not being fully latched. When the bins are closed one latch may not be latched but the other side may be latched. In a standing still position, the single latch may hold but during various maneuvers, the single latch may become unlatched.

It would therefore be desirable to provide a latch assembly that may be easily visually inspected to provide an indication as to whether the latch is properly closed. Also, it is desirable to provide a latch handle that is easily actuated by people with various vertical attributes.

SUMMARY

In one aspect of the invention an assembly for providing an indicator includes a light source, a stationary member, a first optical fiber coupled to the light source and to the stationary member, a movable panel, and a first latch assembly coupling the stationary member and the movable panel. The latch assembly has an unlatched position and a latched position. The assembly further includes a second optical fiber coupled to the movable panel, an indicator coupled to the movable panel, and a second optical fiber whereby in the last position, light from the first optical fiber is coupled to the second optical fiber differently than in the latched position.

In a further aspect of the invention, a method includes providing an overhead storage bin rotatably mounted to a stationary member, coupling light from the first optical fiber to a second optical fiber when a latch on the bin is latched and decoupling light from the first optical fiber to the second optical fiber when the latch on the bin is unlatched.

One advantage of the invention is that a visual indication of the unlatched latch is easily ascertainable. That is, when the latch is in an unlatched position, flight attendants may easily see that the latch is not properly latched.

Another advantage of the invention is that the system is passive in that no power source is required within the overhead bin.

Other advantages and features of the present invention will become apparent when viewed in light of the detailed description of the preferred embodiment when taken in conjunction with the attached drawings and appended claims.

DETAILED DESCRIPTION OF THE PREFERRED EMBODIMENT

Figure 1:
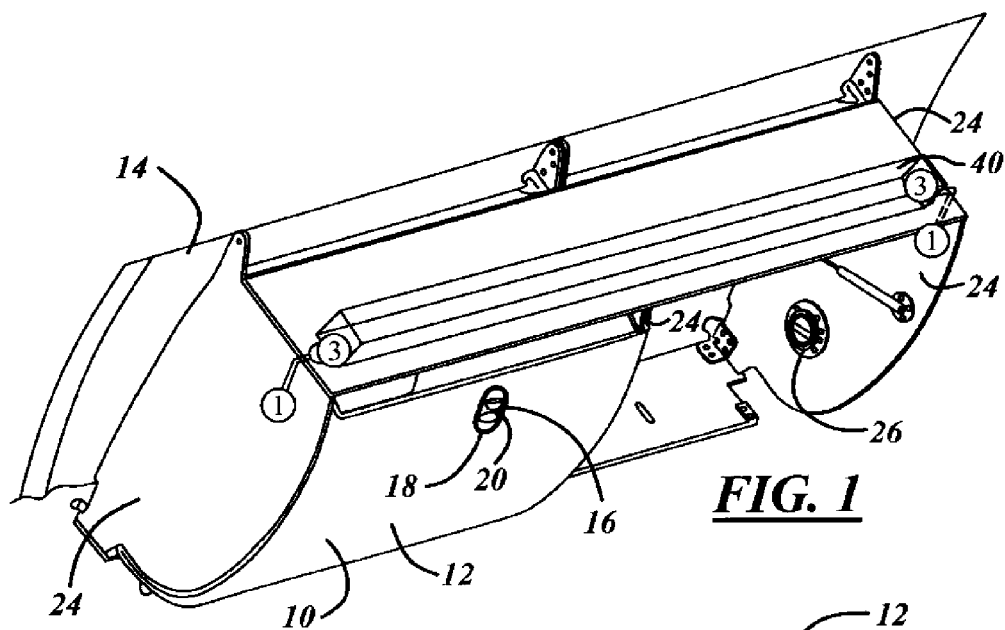
FIG. 1 is a perspective view of a movable panel illustrated as an overhead storage bin and door.

In the following figures the same reference numerals will be used to illustrate the same components. The present invention is described with respect to an overhead storage bin for an aircraft. However, the present invention is suitable for various locations within an aircraft. Also, the invention is suitable for use in various other types of applications beyond aircraft applications which include automotive and non-automotive uses.

Figure 2:
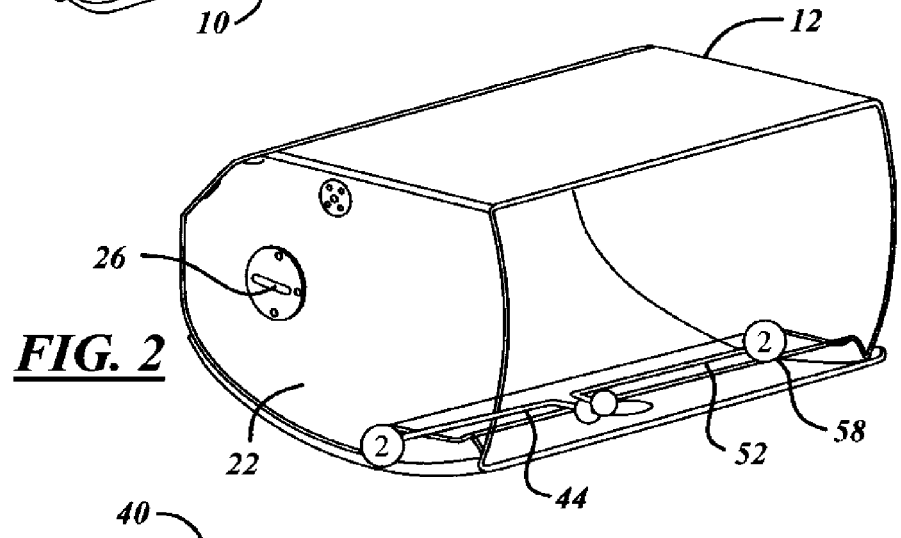
FIG. 2 is a schematic representation of a handle and latch assembly formed according to the present invention.
Figure 3:
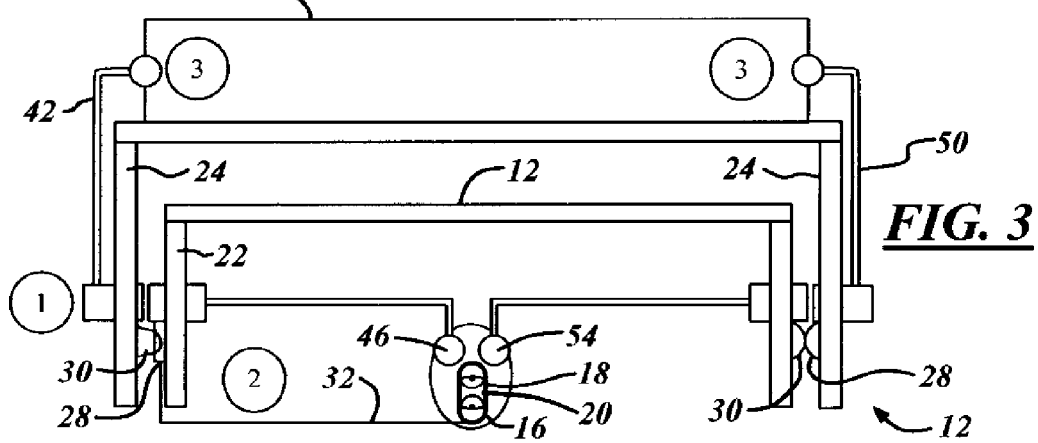
FIG. 3 is a perspective view of an overhead bin formed according to the present invention.

Referring now to FIGS. 1, 2 and 3, a movable panel 10 for an overhead storage bin 12 for an airplane 14 (a portion of which is shown) is illustrated. The movable panel 10 includes a latch assembly 16 formed therein. The latch handle assembly 16 is used to actuate a latch to hold the overhead bin 12 in a closed position.

The latch assembly 16 includes a bezel 18 and a handle 20. The bezel 18 is generally flush with the surface of the panel 10 and is recessed therein.

The overhead storage bin 12 includes the movable panel 10 and end panels 22. End panels 22 move with the movable panels 10. In the art, the movable panel 10 may be called a face panel. The airplane 14 may include a stationary member 24. The stationary member 24 may be included on each of the overhead storage bin 12. End panel 24 may be coupled directly to the airplane or to another stationary structure of the airplane. A hinge 26 may be used to couple the stationary members 24 to the end panel 22. The end panel 22 may include a pair of latches 28. The stationary members 24 may include a strike 30. A transmission mechanism 32 is used to couple the latch assembly 16 to the latch 28. Transmission mechanism 32 allows the latch 28 to engage and disengage the strike 30 to hold the overhead bin in a closed position. As will be described below, it is desirable for both latches to be used to engage the strikes 30 so that the overhead bin is not inadvertently opened during the operation of the aircraft or other vehicle into which the latch assembly is mounted. An indication at the latch assembly may be provided to indicate that one of the latches is not properly latched. This is transmitted to the latch assembly through the transmission mechanism 32 in a mechanical fashion. The transmission mechanism 32 may be one of a variety of types of transmission mechanisms such as a torque tube, cables, arm linkages, cams, gears, or the like. The latch 28 may be various types of latches that are used to engage a strike 30. Various types of latches and strikes may be used.

An LED lighting array 40 may be coupled to a stationary member 24. The stationary member 24 may be a top surface of an overhead bin enclosure. Of course, the lighting array 40 may be located in various locations. The lighting array includes a first optical fiber 42 that is coupled to the stationary member 24. As is illustrated, the first optical fiber is disposed through the stationary member 24. However, in various embodiments the optical fiber may be located within or on the stationary member 24. A second optical fiber 44 is coupled to the end panel 22. The second optical fiber 44 is also coupled to an indicator 46. As is shown, when the bin is in a properly closed and latched position, optical fiber 42 couples light to optical fiber 44 which is then used to illuminate the indicator 46.

The lighting array 40 may also be coupled to a third optical fiber 50 which is also coupled to a stationary member 24. A fourth optical fiber 52 is coupled to an end panel 22 and to a second indicator 54. Thus, when the latch near the optical fibers 50, 52 is properly latched, light is coupled from the third optical fiber to the second optical fiber 52 which in turn illuminates the indicator 54. As will be described below, indicators 46, 54 may be located in a flange of the light handle assembly 16 or located adjacent to the light handle assembly 16. Should only one latch be present, only one indicator may be required. The overhead storage bin 12 may include a restrictor panel 58. The restrictor panel 58 is used to prevent articles from the overhead bin from easily rolling out. The restrictor panel 58 may have a hollow underside and may be used to conceal the second optical fiber 44 and the fourth optical fiber 52.

Figure 4:
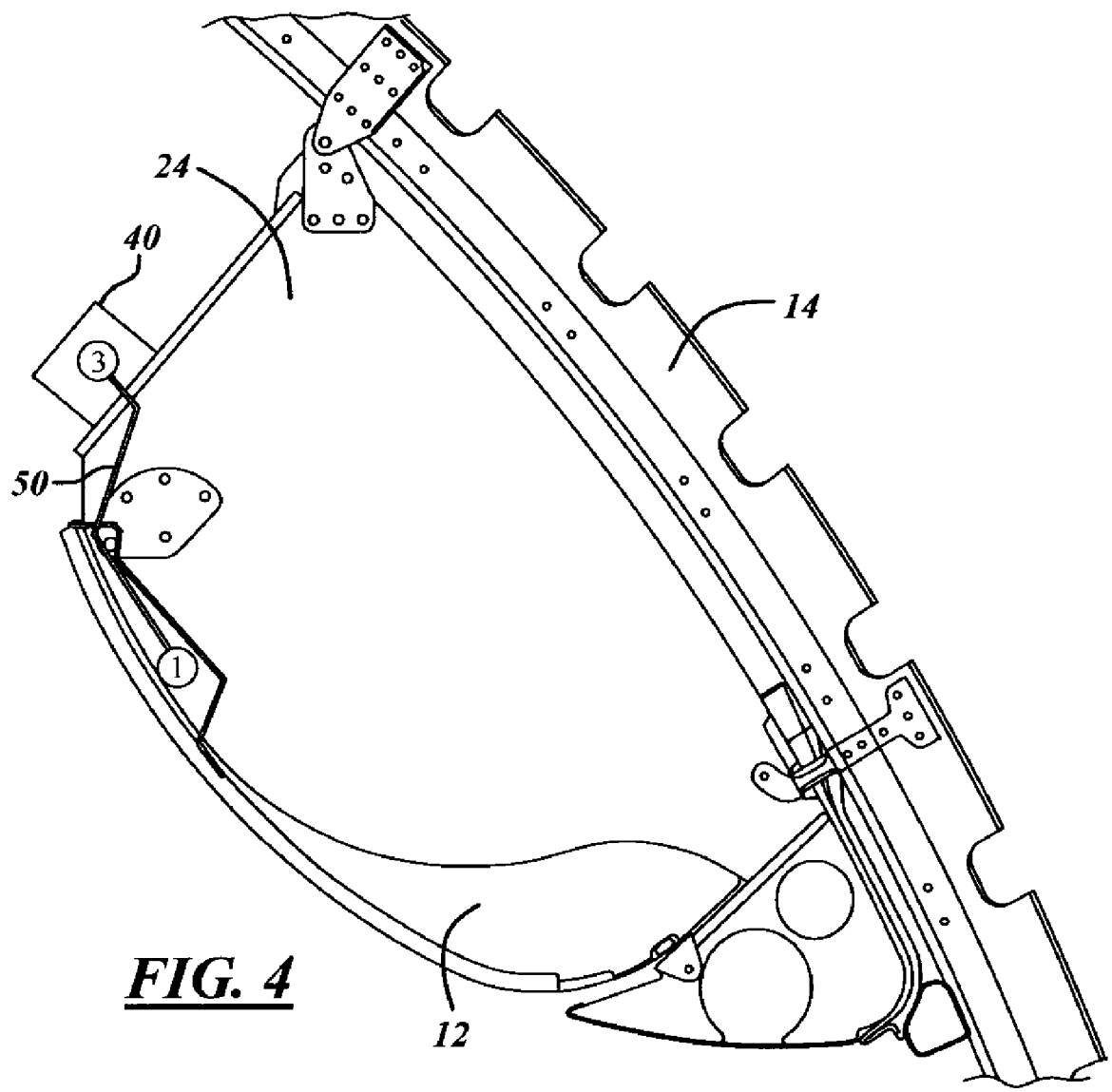
FIG. 4 is a side view of a bin formed according to the present invention.

Referring now to FIG. 4, a side view of overhead bin 12 is illustrated. It should be noted that both sides may be configured in a similar manner. In this view, the third fiber optic 50 and the LED lighting array 40 is illustrated.

Figure 5A:
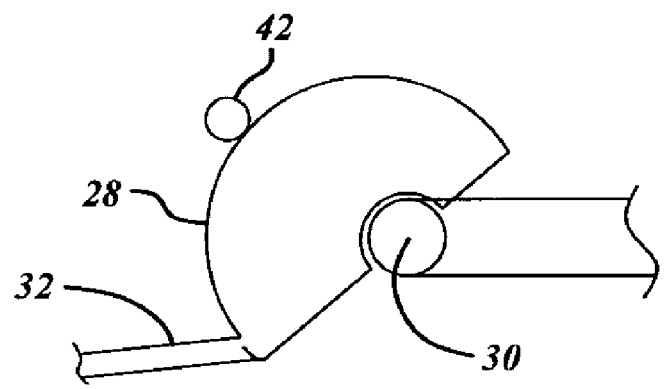
FIGS. 5A and 5B are side views of a latch in a respective latched an unlatched position.
Figure 5B:
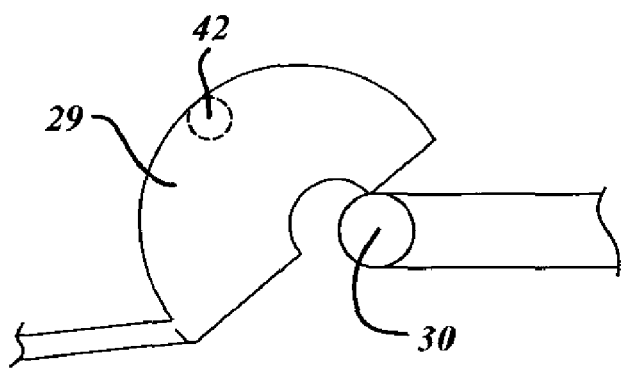

Referring now to FIGS. 5A and 5B, first optical fiber 42 is illustrated. The transmission means 32 and a latch 28 are also illustrated. In FIG. 5A the latch is properly latched and the light from optical fiber 42 is transmitted to the second optical fiber 44. In FIG. 5B, when the latch 28 is not properly latched, the latch 28 blocks the light from the first optical fiber 42 from entering the second optical fiber 44.

Figure 6:
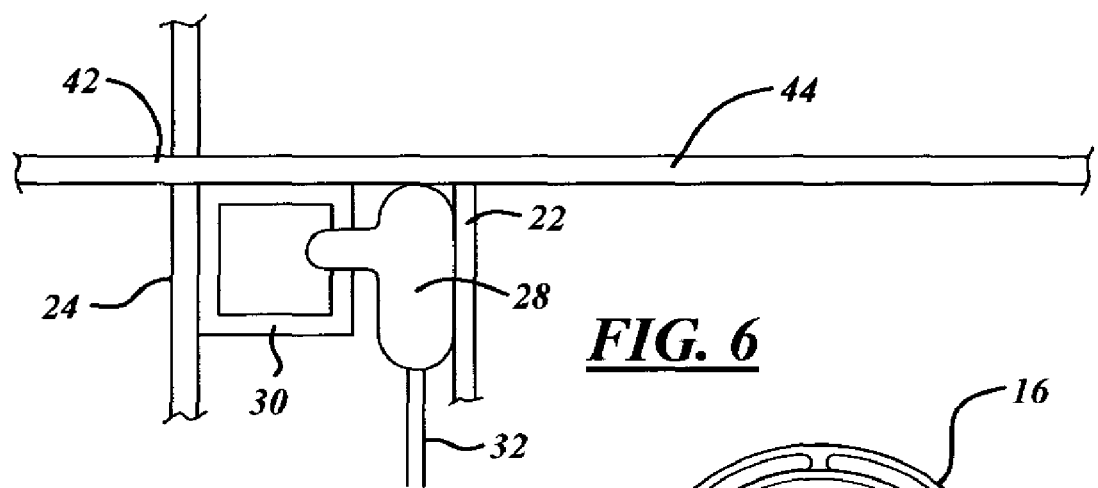
FIG. 6 is a side view of a latch according to the present invention.

Referring now to FIG. 6, the first optical fiber 42 may be coupled to a strike 30 and the second optical fiber 44 may be coupled to a latch 28. Thus, when the latch 28 is properly engaged with the strike 30, the light from the first optical fiber 42 is coupled to the light from the second optical fiber 44.

Figure 7:
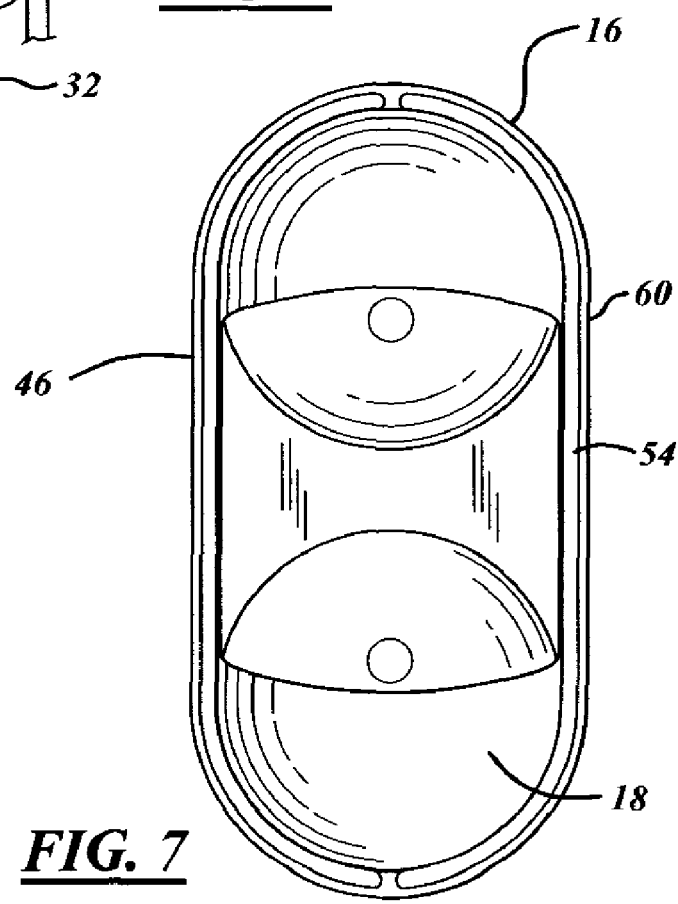
FIG. 7 is a front view of an embodiment of a latch, indicator and a lock.

Referring now to FIG. 7, a latch handle assembly 16 is illustrated. In this embodiment, indicators 46 and 54 are illustrated in elongated half circles. The bezel 18 has a flange 60. The indicators 46, 54 are embedded within the flange 60 to provide a clean look. Thus, when one latch or the other latch or both latches are not properly coupled, the first indicator 46, the second indicator 54, or both indicators 46, 54 are not illuminated. The means to illuminate the indicators 46, 54 may be any one of the above set forth embodiments.

Figure 8:
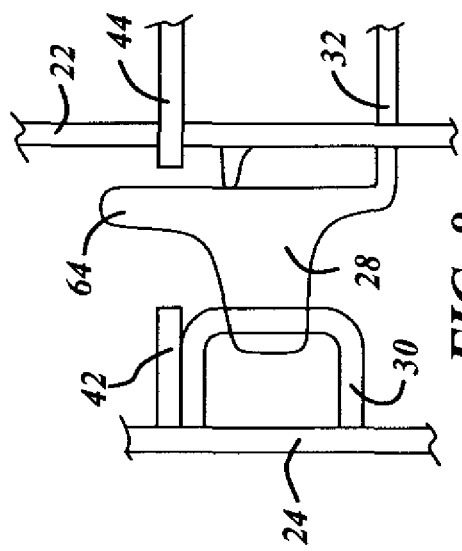
FIG. 8 is a side view of a latch having in a latched position blocking light in an alternative embodiment of the present invention.
Figure 9:
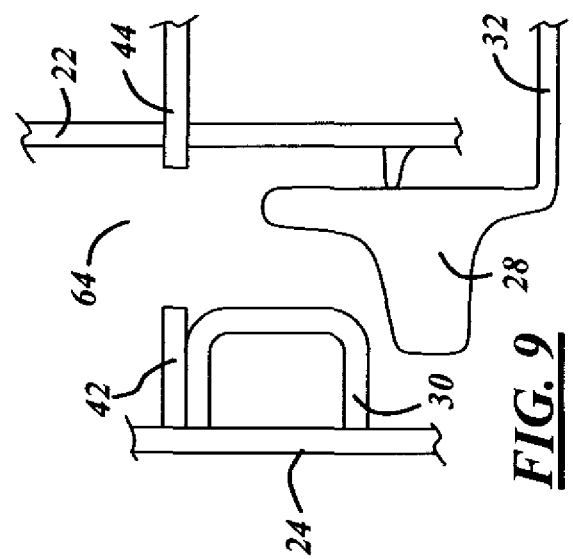
FIG. 9 is a side view of a latch having in a unlatched position passing light in an alternative embodiment of the present invention.

Referring now to FIG. 8, the illumination may also work in the opposite direction than that described above. In this embodiment the latch 28 is properly engaged with the strike. However, a flag 64 is used to block the illumination from the first optical fiber 42 from being coupled into the second optical fiber 44. When the latch is not properly latched, as is illustrated in FIG. 9, light is coupled between the first optical fiber 42 and the second optical fiber 44.

Figure 10:
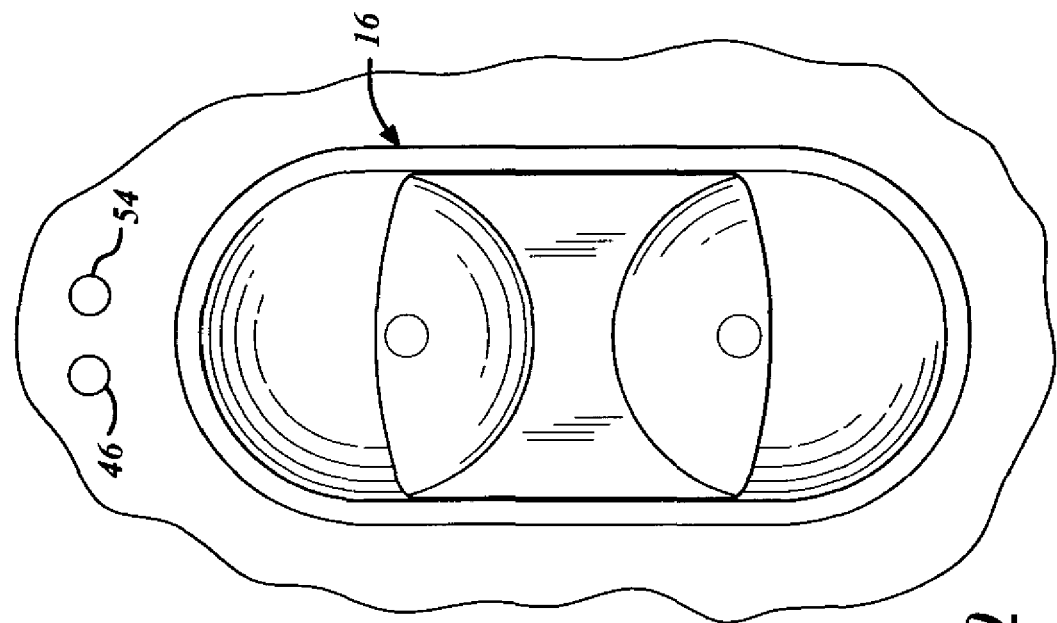
FIG. 10 is a front view of a latching mechanism according to one embodiment of the present invention.

Referring now to FIG. 10, the indicators 46 and 54 may be formed as an illumination source above the latch handle assembly 16. Further, the illuminators 46, 54 may be combined into one illuminator such that an indication of a latch is provided with one indicator. It should be noted that various lenses or the like may be used together with the fiber optics to help the light pass from one fiber to another.

While particular embodiments of the invention have been shown and described, numerous variations and alternate embodiments will occur to those skilled in the art. Accordingly, it is intended that the invention be limited only in terms of the appended claims.

What is claimed is:

1. An overhead bin assembly comprising:
    a light source;
    a stationary member;
    a first optical fiber coupled to said light source and to the stationary member;
    a movable storage bin;
    a first latch assembly coupling the stationary member and the movable storage bin, said latch assembly having an unlatched position and a latched position;
    a second optical fiber coupled to the movable storable bin;
    a third optical fiber coupled to said light source and to the stationary member;
    a second latch assembly coupling the stationary member and the movable storage bin, said latch assembly having an unlatched position and a latched position;
    a third optical fiber coupled to the movable storage bin;
    said first indicator comprises a first portion corresponding to the first latch assembly and a second portion corresponding to the second latch assembly,
    wherein in the latched position, light from the first optical fiber is coupled to the second optical fiber and in the unlatched position, light from the first optical fiber is uncoupled relative to the second optical fiber and wherein in the latched position, light from the third optical fiber is coupled to the fourth optical fiber and in the unlatched position, light from the third optical fiber is uncoupled relative to the fourth optical fiber or wherein in the unlatched position light from the first optical fiber is coupled to the second optical fiber and in the latched position light from the first optical fiber is uncoupled relative to the second optical fiber and wherein in the unlatched position light from the third optical fiber is coupled to the fourth optical fiber and in the latched position light from the third optical fiber is uncoupled relative to the fourth optical fiber.

2. An assembly as recited in claim 1 wherein the second latch assembly is disposed on an opposite side of the movable storage bin than the first latch assembly.

3. An assembly as recited in claim 1 wherein the second optical fiber is coupled within a restrictor panel disposed on a front edge of the bin.

4. An assembly as recited in claim 1 wherein a bezel comprises a flange disposed against an outer surface of the panel and the indicator is disposed within the flange.

* * * * *